Figure 1:
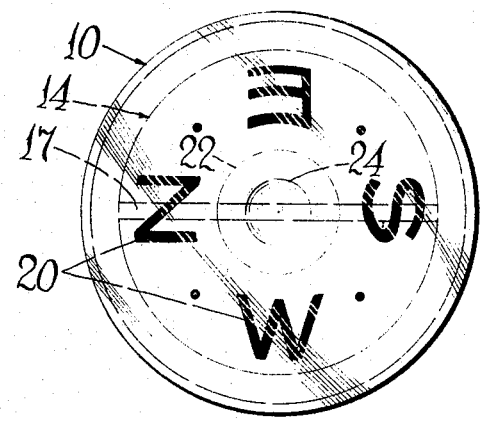

Nov. 22, 1966 — J. P. SMOKOWSKI — 3,286,358
ENCASED FLOAT
Filed March 19, 1962

INVENTOR.
Jordan P. Smokowski,
BY
Bean, Brooks, Buckley & Bean.
ATTORNEYS.

United States Patent Office 3,286,358
Patented Nov. 22, 1966

3,286,358
ENCASED FLOAT
Jordan P. Smokowski, 875 Fillmore Ave., Buffalo, N.Y.
Filed Mar. 19, 1962, Ser. No. 182,993
7 Claims. (Cl. 33—223)

This invention relates to an encased float and particularly to a device wherein the rotatable component is maintained in a buoyant condition in a liquid medium for substantially frictionless rotation relative to a holder or casing. This application is a continuation-in-part of my copending application, Serial No. 695,302, filed November 8, 1957, which is abandoned.

The general or basic idea of an encased float is not new. In one prior art proposal, Story Patent 2,765,541, a hemispherical indicating element for a magnetic compass is floated in liquid in a transparent spherical casing and the upper circumferential edges of the hemispherical member must cooperate with a meniscus formed by the liquid to maintain the float member centered in the casing. This general arrangement requires a precision of manufacture of the parts which renders the same expensive to construct and unreliable in operation. These objections are attributable, in part, to the action of the meniscus on the float. Furthermore, the amount of liquid must be precise for the meniscus to form at the desired level.

The present invention provides a magnetic compass which consists of a transparent hollow spherical outer shell or casing and a substantially smaller inner spherical member which includes a magnetic needle and is floated in liquid within the outer shell or casing. The arrangement of the present invention is such that generous tolerance may be present as between the inside diameter of the transparent casing and the outside diameter of the float member and novel means are provided for maintaining the inner float member fully buoyant and out of frictional contact with the spherical inner wall of the outer casing.

The outer casing contains sufficient liquid to immerse the float member and leave a relatively small quantity of air which naturally seeks the uppermost part of the interior of the casing. This air is sufficiently small in volume so that it forms a bubble which acts as a resilient cushion which urges the upper end of the float member downwardly out of contact with the upper interior wall of the casing. The term "bubble" as used in the preceding sentence means specifically a globule of air completely encased in a continuous liquid film or envelope. Surface tension of the liquid causes the air bubble to assume an ellipsoidal shape or what may be termed an "oblate spheroid" and a depression in the top center of the float member may be provided for receiving the lower part of the ellipsoidal bubble, thus tending to stabilize the float member and retain the same in a vertical position against undue oscillation.

The mere presence of air above the float without the liquid film which completely encases the same in the present invention is entirely repugnant to the principles of the present invention and would render the same incapable of operating in the intended manner. If conditions supervene which cause the bubble to disrupt, that is, if the continuous liquid film which forms a part of the bubble element of the present combination should rupture, then the intended function of the bubble is destroyed and the structure is incapable of operating in accordance with the principles of the present invention. In such case the vertical position of the float would be determined solely by its relative buoyancy, as in the above Story patent, and not by the yieldable spacing action of a liquid-encased air bubble.

The spherical contours of the outer casing and the inner float are advantageous from various practical and manufacturing standpoints but are not theoretically essential. The essential requirements are that the buoyant float, whatever its shape must have a center of gravity below its geometrical center to maintain it in a generally upright position; it must have a specific gravity less than that of the liquid in the casing; the upper interior of the casing should be wettable by the liquid in the casing and should be dome-like or of such contour as to receive and center the air bubble so that the latter may serve as a yieldable downward force on the float member. Also, the air bubble, that is the globule of air encased in a continuous liquid film, must be of such volume as to perform this function, although the size of the air bubble is by no means critical. Further, as indicated above, the central depression in the top of the float member receives the bubble and, since the surface tension of the liquid which envelopes the air in the bubble causes the bubble to assume a shape as nearly spherical as space permits, tends to stabilize the float member in an upright position.

Further objects and advantages of the compass construction of the present invention will appear from a study of the embodiment set forth herein by way of example. However, it is to be understood that the embodiment illustrated in the drawing and described in detail in the following specification is merely exemplary and that certain mechanical modifications therein may be made without departing from the principles of the present invention, the scope of which is limited only as defined in the appended claims.

Figure 2:
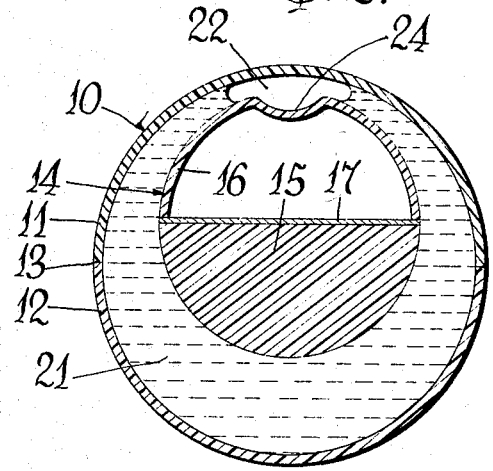

FIG. 1 is an external top plan view of one form of the compass of the present invention; and FIG. 2 is a vertical cross-sectional view through the compass of FIG. 1.

The compass of the present invention is of such simplicity in design and construction and is so free of requirements for close fits and precision of manufacture that the same may be made at extremely low cost. Referring particularly to FIG. 2, the outer transparent cylindrical casing, in the form of the invention set forth herein by way of example, is designated generally by the numeral 10 and comprises upper and lower hollow hemispherical members 11 and 12 which may be cemented together as at 13 in any desired manner.

In the present instance the inner direction indicating spherical member is designated generally by the numeral 14 and comprises a lower substantially solid hemispherical member 15 and an upper hollow hemispherical member 16, the two members 15 and 16 being likewise cemented, heat sealed, or otherwise fixed to each other to form the inner sphere 14.

A magnetic bar or needle 17 extends diametrically across the upper flat surface of the solid lower hemispherical member 15 and may be attached thereto in any desired manner. In the present instance the lower peripheral edge of the upper hollow hemispherical member 16 may be notched at diametrically opposed points to receive the opposite ends of the needle or magnetic bar 17, the remainder of the lower periphery of member 16 being cemented to the upper surface of hemispherical member 15.

The upper hemispherical member 16 of the inner sphere 14 is provided with indicia, as clearly indicated in FIG. 1 at 20 to indicate compass directions, the indicia being properly oriented with respect to the magnetic needle or bar 17. Correction for the variation between the magnetic and geographic poles may be incorporated if desired.

The space between inner sphere 14 and outer sphere 10 is generally filled with a liquid medium such as water as indicated at 21 to float the inner sphere 14 in the outer sphere 10. The liquid 21 does not quite fill this interior space so that an air bubble 22 remains. This air bubble comprises a globule of air completely enclosed in a liquid film. If desired a small amount of a wetting agent may be added to promote formation of the desired bubble. This air bubble naturally orients itself at the top of the interior of the outer sphere 10 and serves as a fluid cushion which keeps the inner sphere 14 downwardly away from the upper interior wall of the outer sphere 10. Gravity and surface tension characteristics of its continuous enclosing liquid film cooperate to maintain the bubble 22 in an uppermost position and of a shape to serve efficiently as a fluid spacer. The upper central part of the inner sphere 14 is preferably provided with an indentation 24 which serves to make the bubble and the inner sphere more stable and less subject to oscillation or hunting.

Further damping of oscillation of the inner sphere may be effected by ridges or grooves on the exterior thereof, such grooves or ridges extending generally like meridian lines. It is to be understood that the upright position of the inner sphere 14 is established in the first instance by the fact that the solid lower half 15 thereof serves as a pendulum or weight to maintain the inner sphere 14 in a position wherein the indentation 24 is uppermost and the needle or bar 17 is thus disposed in a horizontal position.

It will be noted that a great disparity in size may exist between the outer and inner spheres as indicated in FIG. 2 without in any way affecting the operation or the accuracy of the compass, thus greatly facilitating efficient and inexpensive manufacture. Also, as explained earlier herein, the spherical shapes of these members represent a preferred embodiment but are not essential. Furthermore, the size of the bubble 22 is not critical and may vary substantially without affecting the performance of its function, namely to serve as a fluid spacer for holding the inner sphere 14 downwardly in the floating medium and for stabilizing the inner sphere 14 in a properly vertical position.

A further advantage of the foregoing arrangement resides in the fact that there is no critical relationship between the specific gravity of the liquid and the specific gravity of the float member, just so the former is somewhat greater than the latter. Too great a difference of specific gravity may cause the float member to exert an upward force tending to disrupt or displace the bubble. By disruption is meant the rupturing or puncturing of the continuous liquid film which completely encloses the air within the bubble. The level at which the float member floats, which would ordinarily be determined by this specific gravity relationship as in the aforesaid Story patent, is in the case of the present invention determined principally by the spacing action of the spheroidal liquid-encased air bubble.

As indicated in FIG. 1, the inner sphere 14 bears directional indicia in registry with the needle 17 to indicate the points of the compass.

In place of the generally arcuate upper interior curvature of the casing 10 a central upward recess or depression may be provided in the upper wall of the casing to receive and center the upper part of the bubble. Such recess may be similar to the depression 24 of the float member but opposite thereto in direction.

I claim:

1. A directional compass comprising an outer transparent hollow spherical casing and an inner spherical float member of substantially smaller diameter than the interior of said casing floating in a liquid medium in said casing, the center of gravity of said float member being below its geometrical center whereby the same floats in a predetermined vertical position, and magnetic means associated with said float member biasing the same about a vertical axis to indicate geographic directions, the liquid medium substantially filling the space between the casing and the float member but leaving a central air bubble between the upper generally spherical surface of the float member and the upper interior surface of the casing, said air bubble comprising a globule of air completely enclosed in a continuous imperforate liquid film to form a resiliently deformable oblate spheroid serving as a fluid spacer to maintain such surfaces out of contact and center the upper end of the float member in the casing.

2. A directional compass comprising an outer transparent hollow spherical casing and an inner spherical float member of substantially smaller diameter than the interior of said casing floating in a liquid medium in said casing, said float member being heavier in its lower portion than its upper portion to maintain the same generally upright, and a magnetic needle extending diametrically across the float member, the liquid medium substantially filling the space between the casing and the float member but leaving a central air bubble between the upper generally spherical surface of the float member and the upper interior surface of the casing, said air bubble comprising a globule of air completely enclosed in a continuous imperforate liquid film to form a resiliently deformable oblate spheroid serving as a fluid spacer to maintain such surfaces out of contact and center the upper end of the float member in the casing.

3. An encased float comprising a hollow casing having a transparent convex upper portion, a float member of substantially smaller size than the interior of said casing and adapted to float in a liquid medium in said casing, said float member having a convex upper surface portion fitting generally within the transparent convex upper portion of the casing, the center of gravity of said float member being below its geometrical center whereby the same floats in a predetermined vertical position, the liquid medium substantially filling the space between the casing and the float member but leaving a central air bubble between the upper convex surface of the float member and the upper interior surface of the casing, said air bubble comprising a globule of air completely enclosed in a continuous imperforate liquid film to form a resiliently deformable oblate spheroid adapted to maintain the upper surface of the float member downwardly out of contact with the upper interior surface of the casing, said float member having a depression in the center of its upper surface for receiving the lower end of said air bubble to stabilize the float member against oscillation of its vertical axis.

4. A directional compass comprising an outer hollow casing having a transparent convex upper portion and an inner float member of substantially smaller size than the interior of said casing and adapted to float in a liquid medium in said casing, said float member having a convex upper surface portion fitting generally within the transparent convex upper portion of the casing, said float member being heavier in its lower portion than its upper portion to maintain the same generally upright, and a magnetic needle extending horizontally across the float member, the liquid medium substantially filling the space between the casing and the float member but leaving a central air bubble between the upper convex surface of the float member and the upper interior surface of the casing, said air bubble comprising a global of air completely enclosed in a continuous imperforate liquid film to form a resiliently deformable oblate spheroid serving as a fluid spacer to maintain such surfaces out of contact, said float member having a central depression in its upper surface for cooperation with said air bubble to center the float member vertically.

5. A directional compass comprising an outer transparent hollow spherical casing and an inner sperical float member of substantially smaller diameter than the interior of said casing floating in a liquid medium in said casing, said float member being heavier in its lower portion than its upper portion to maintain the same generally upright, and a magnetic needle extending diametrically across the float member, the liquid medium substantially filling the space between the casing and the float member but leaving a central air bubble between the upper generally sperical surface of the float member and the upper interior surface of the casing, said air bubble comprising a globule of air completely enclosed in a continuous imperforate liquid film to form a resiliently deformable oblate spheroid serving as a fluid spacer to maintain such surfaces out of contact, said float member having a central depression in its upper end to receive the lower end of said bubble and tend to stabilize the float member and the bubble.

6. A directional compass comprising an outer transparent hollow spherical casing and an inner spherical float member of substantially smaller diameter than the interior of said casing floating in a liquid medium in said casing, the center of gravity of said float member being below its geometrical center whereby the same floats in a predetermined vertical position, and magnetic means associated with said float member biasing the same about a vertical axis to indicate geographic directions, the liquid medium substantially filling the space between the casing and the float member but leaving a central air bubble between the upper generally spherical surface of the float member and the upper interior surface of the casing, said air bubble comprising a global of air completely enclosed in a continuous imperforate liquid film to form a resiliently deformable oblate spheroid serving as a fluid spacer to maintain such surfaces out of contact, said float member having a central depression in its upper end to receive the lower portion of the bubble and thereby stabilize the float member vertically.

7. An encased float comprising a hollow casing having a transparent convex upper portion, a float member of substantially smaller size than the interior of said casing and adapted to float in a liquid medium in said casing, said float member having a convex upper surface portion fitting generally within the transparent convex upper portion of the casing, the center of gravity of said float member being below its geometrical center whereby the same floats in a predetermined vertical position, the liquid medium substantially filling the space between the casing and the float member but leaving a central air bubble between the upper surface of the float member and the upper interior surface of the casing, said air bubble comprising a globule of air completely enclosed in a continuous imperforate liquid film to form a resiliently deformable oblate spheroid adapted to maintain the upper surface of the float member downwardly out of contact with the upper interior surface of the casing, said hollow casing upper portion including an upwardly directed concavity in its under surface for receiving the upper end of said air bubble to center the same, said float member having a depression in the center of its upper surface for receiving the lower end of said air bubble to stabilize the float member against oscillation of its vertical axis.

References Cited by the Examiner

UNITED STATES PATENTS

| | | | |
|---|---|---|---|
| 856,990 | 6/1907 | Schweder | 33—205 |
| 1,277,748 | 9/1918 | Owen | 33—212.2 |
| 1,376,727 | 5/1921 | Pentz et al. | 33—206.2 |
| 2,012,455 | 8/1935 | Bazzoni | 33—205.5 |
| 2,765,541 | 10/1956 | Story | 33—206 X |

FOREIGN PATENTS 940,549   3/1956   Germany.

ROBERT B. HULL, *Primary Examiner.*

ISAAC LISANN, *Examiner.*

R. P. WILLIAMS, *Assistant Examiner.*